July 4, 1950  C. C. HEMPFLING  2,513,483
SAFETY LATCH
Filed Nov. 12, 1947
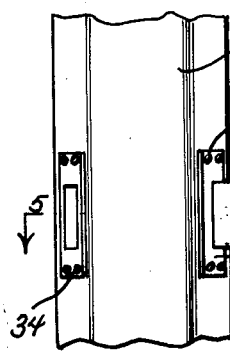
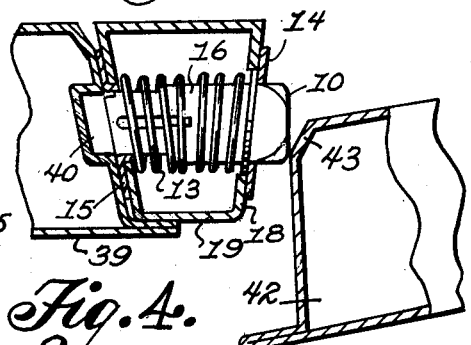
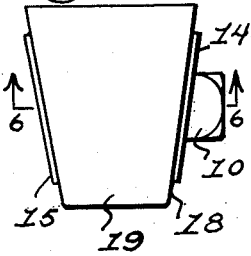
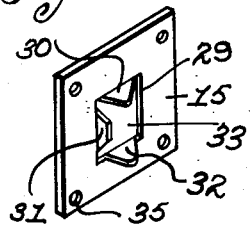
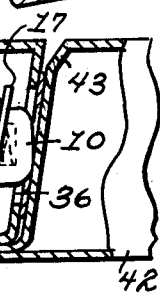
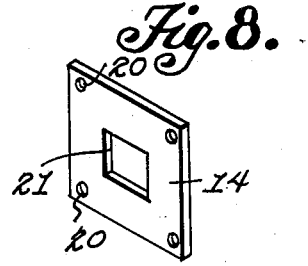
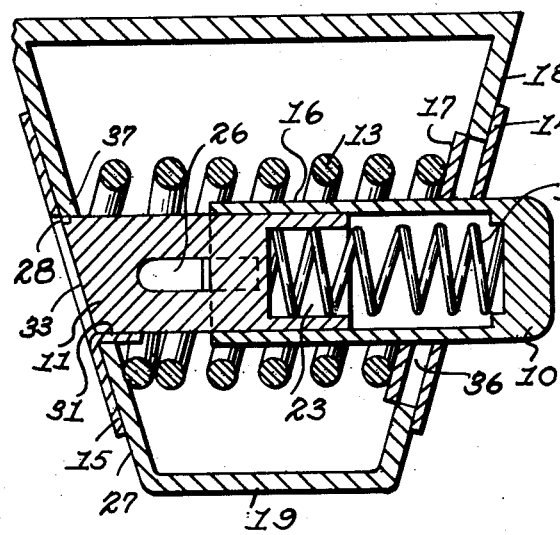
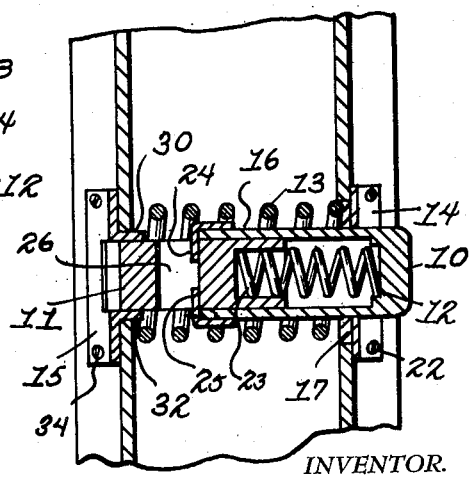
INVENTOR.
Curtis C. Hempfling
BY Victor J. Evans & Co.
ATTORNEYS

UNITED STATES PATENT OFFICE 2,513,483

SAFETY LATCH

Curtis C. Hempfling, Butler, Pa.

Application November 12, 1947, Serial No. 785,289

1 Claim. (Cl. 292—182)

This invention relates to door latches particularly for motor vehicles of the four door type having front and rear doors, and in particular a latch for holding the rear doors closed until a front door is opened.

The purpose of this invention is to prevent a child in the rear seat of a motor vehicle opening one of the rear doors of the vehicle and falling out.

Various types of locks and latches have been devised for locking the rear doors of motor vehicles but these have not been accepted universally as they are usually in the form of attachments or where they are incorporated in the door or wall of the vehicle it is impossible to close the rear door with the front door closed and also impossible to set the device to inoperative positions. With these thoughts in mind this invention contemplates a latch inserted in the post between the front and rear door of a vehicle in which the rear door may be closed with the front door closed and in which both ends thereof may be set to inoperative positions.

The object of this invention is to provide a latch for locking rear doors of motor vehicles having front and rear doors wherein the parts thereof may be set to inoperative positions.

Another object of the invention is to provide a rear door latch for motor vehicles that may readily be installed in the post between the front and rear doors of the vehicle.

Another object of the invention is to provide a lock for rear doors of motor vehicles having front and rear doors that permits closing the rear door with the front door closed.

A further object of the invention is to provide a rear door latch for motor vehicles having four doors which is of a simple and economical construction.

With these and other objects and advantages in view the invention consists of the new and useful combination, construction, and arrangement of parts as more fully described herein, set forth in the claim appended hereto, and disclosed in the accompanying drawings forming part hereof, wherein:

Figure 1 is a view showing a side elevation of a post between front and rear doors of a motor vehicle with the improved latch incorporated therein and with the upper and lower ends broken away.

Figure 2 is a plan view showing the post in outline and illustrating the position of the latch therein.

Figure 3 is a sectional plan through the post, latch, and associated edges of the front and rear doors with the front door partly closed.

Figure 4 is a similar view showing the doors closed.

Figure 5 is a sectional plan on an enlarged scale taken on line 5—5 of Figure 1 illustrating the latch with the front door button extended and with the rear door lock bolt withdrawn.

Figure 6 is a vertical section through the post and latch taken on line 6—6 of Figure 2 with the parts in the position as shown in Figure 5.

Figure 7 is a detail showing a face plate as used on the rear door side of the post.

Figure 8 is a detail showing the face plate used on the front door side of the post.

Referring now to the drawings wherein like reference characters indicate corresponding parts the rear door latch of this invention includes a square button 10 having a lock bolt 11 telescoping therein, an inner spring 12, an outer spring 13, and face plates 14 and 15.

The button 10 is formed with a tubular shell 16 and a flange 17 is secured to the outer surface in an inclined position corresponding with the slope of the surface 18 of the post 19, and with the face plate 14 secured to the surface 18 by screws in openings 20 thereof the latch will be retained in the post with the button 10 projecting through a square opening 21 in the face plate. The entire latch may be removed from the post by removing the four screws 22 of the face plate.

The lock bolt 11 is slidably mounted in the tubular shell 16 of the button and the bolt is resiliently held outward by the spring 12 that extends into a socket 23. The outward movement of the bolt is limited by fingers 24 and 25 on the end of the shell 16 which extend into a slot 26 in the bolt as shown in Figure 6, and these fingers also draw the bolt inward as the button is forced outward by the spring 13 when the front door is opened. The outer end of the lock bolt is beveled to correspond with the slope of the surface 27 of the post 19 and the inner corner thereof is provided with a notch 28 that may be snapped over an edge 29 of the face plate 15 to hold the bolt in the post. The face plate 15 is provided with inwardly extending guides 30, 31, and 32 around three sides of an opening 33 therein to retain the end of the bolt in position and the plate is secured on the surface 27 of the post by screws 34 in openings 35 in the plate.

The surfaces 18 and 27 of the post 19 are provided with openings 36 and 37 in which the latch is installed and the edge 38 of the rear door 39 is provided with a socket 40 to receive the end of the lock bolt, as shown in Figure 4. The inner corner of the rear door may be provided with a beveled surface 41 and the corresponding corner of the front door 42 may have a beveled surface 43 to facilitate sliding the latch elements inward as the doors are closed.

With the parts arranged in this manner the lock bolt 11 may be held in the post by snapping the notch 28 over the edge of the face plate and the button 10 may be pressed inward by the thumb or a finger and by moving it slightly toward one side it will engage the inner surface of the face plate 14 and be retained in the post thereby. The parts may also be released and as the front door is closed the bottom 10 will be forced inward which will release the lock bolt and the spring 12 will actuate the bolt to the outward position in which it will snap into the socket 40 in the rear door. Should the rear door be open it may be closed and the bolt will be forced inward until it snaps into the socket wherein the rear door will be locked until the front door is opened.

It will be understood that modifications may be made in the design and arrangement of the parts without departing from the spirit of the invention.

What is claimed is:

In a motor vehicle rear door safety latch, the combination which comprises a lock bolt rectangular shaped in cross section having a beveled outer end corresponding with the bevel surface of a post between a front and rear door of a vehicle, and having a socket in the inner end, a tubular button rectangular shaped in cross section and having a flange on the outer surface positioned at an angle in relation to the button corresponding to the angle of inclination of the surface of the said post, between the front and rear doors of the vehicle, said button slidably mounted on said lock bolt, a spring in the button with one end extended into the socket in the inner end of the said lock bolt, said lock bolt having a slot therethrough and said button having fingers on the inner end extended into the said slot of the lock bolt for preventing accidental separation of the button from the lock bolt, a spring around said lock bolt and button positioned with one end against the angularly positioned flange of the button and the other against the inner surface of the said post on the side thereof in which the said lock bolt is positioned, a face plate having an opening with inwardly extended guides on the sides of the opening for receiving the said lock bolt, said face plate positioned on the outer surface of the post on the side in which the said lock bolt is positioned, and a face plate on the opposite side of said post having an opening therein through which the said button extends when the front door positioned to coact with the button is open.

CURTIS C. HEMPFLING.

REFERENCES CITED

The following references are of record in the file of this patent:

UNITED STATES PATENTS

| Number | Name | Date |
| --- | --- | --- |
| 1,037,302 | Parent | Sept. 2, 1912 |
| 1,240,086 | Parker | Sept. 11, 1917 |
| 1,790,104 | Levitt et al. | Jan. 27, 1931 |